United States Patent [19]
Sakuta

[11] Patent Number: 4,747,319
[45] Date of Patent: May 31, 1988

[54] ACTUATOR

[75] Inventor: Junshi Sakuta, Higashimatsuyama, Japan

[73] Assignee: Jidosha Kiki Co., Ltd., Tokyo, Japan

[21] Appl. No.: 941,252

[22] Filed: Dec. 12, 1986

[30] Foreign Application Priority Data

Dec. 16, 1985 [JP] Japan .................................. 60-282425
May 20, 1986 [JP] Japan .................................. 61-115414

[51] Int. Cl.⁴ ........................ F16H 25/22; F16H 57/10
[52] U.S. Cl. .................................... 74/89.15; 74/411.5
[58] Field of Search ............. 74/89.15, 411.5, 424.8 R

[56] References Cited

U.S. PATENT DOCUMENTS

| | | | |
|---|---|---|---|
| 2,431,430 | 11/1947 | Shaw | 384/285 |
| 3,449,978 | 6/1969 | Stimpson | 74/411.5 |
| 3,559,499 | 2/1971 | Profet | 74/411.5 |
| 3,792,619 | 2/1974 | Cannon et al. | 74/89.15 |
| 3,802,281 | 4/1974 | Clarke | 74/89.15 |
| 3,994,178 | 11/1976 | Hore | 74/89.15 |
| 4,149,430 | 4/1979 | F'Geppert | 74/89.15 |
| 4,635,491 | 1/1987 | Yamano | 74/89.15 |

FOREIGN PATENT DOCUMENTS

| | | | |
|---|---|---|---|
| 484740 | 11/1975 | Australia | 74/411.5 |
| 54-115016 | 8/1979 | Japan . | |
| 57-139485 | 8/1982 | Japan . | |
| 58-180869 | 10/1983 | Japan . | |
| 61-7973 | 3/1986 | Japan . | |

OTHER PUBLICATIONS

Chironis, *Mechanisms, Linkage & Mechanical Controls*, McGraw-Hill, 1965, pp. 26-29.

Primary Examiner—Lawrence J. Staab
Attorney, Agent, or Firm—Flynn, Thiel, Boutell & Tanis

[57] ABSTRACT

An actuator causes an elevating motion of an output rod fitted around a threaded shaft as the latter rotates. A lock mechanism which prevents an unintended rotation of the threaded shaft or a brake which frictionally prevents such rotation is provided in response to the application of either compressive or tensile load upon the output rod when the output rod has been raised and held stationary.

7 Claims, 18 Drawing Sheets

F I G. 12
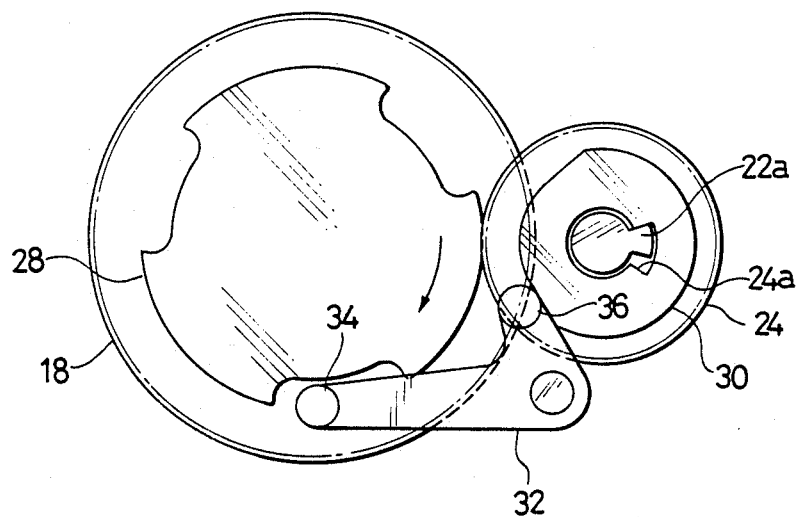
F I G. 13
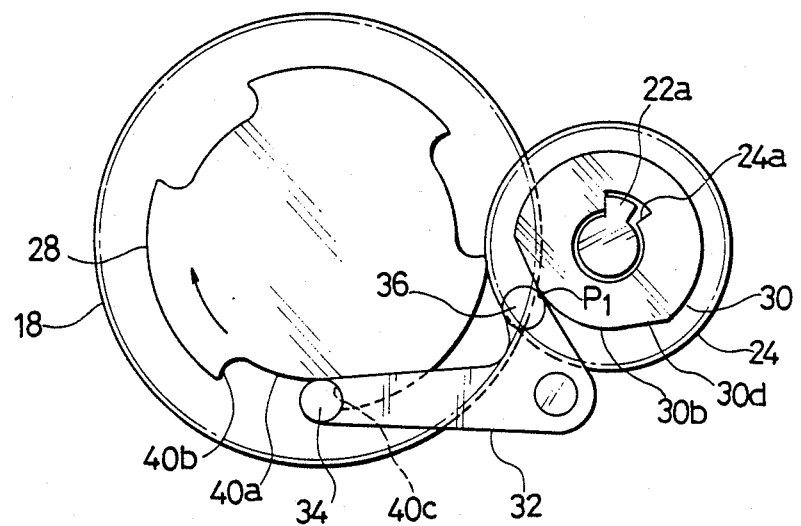

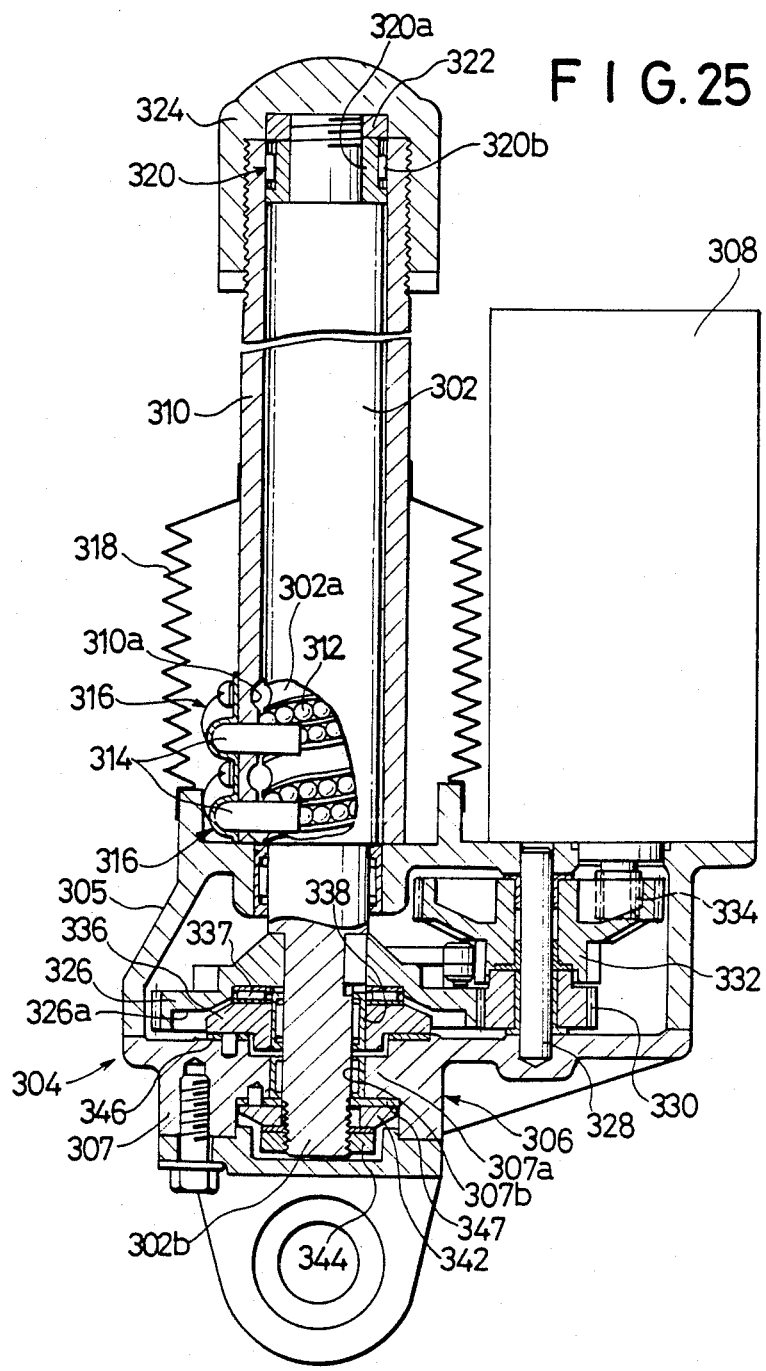

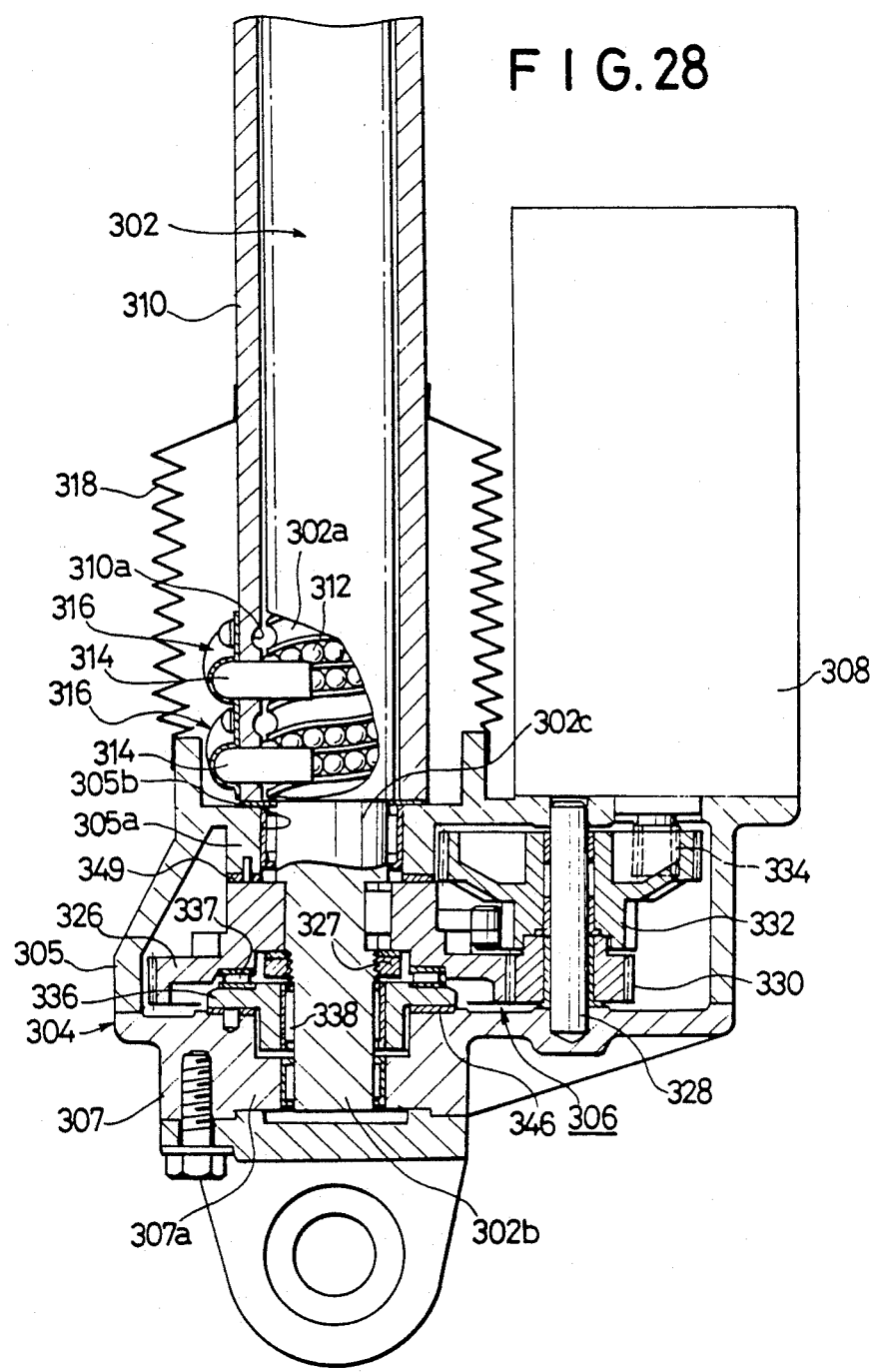

ACTUATOR

BACKGROUND OF THE INVENTION

The invention relates to an actuator which may find application in a cab tilting apparatus of a cab-over, large-sized vehicle, for example.

In a large-sized truck of cab-over type, an engine room is disposed underneath a driver's platform which is commonly referred as a cab, and a cab tilting apparatus is provided to lift the cab to its forwardly tilted position so that the maintenance and inspection of an engine and associated parts located within the engine room may be made.

It is generally necessary that the cab tilting apparatus be associated with a mechanism which prevents a falling down of the cab under gravity when an output rod is raised and is brought to a halt with a cab assuming a forwardly tilted position and which also prevents the cab from turning over in the forward direction in the event the cab is further caused to tilt forwardly until its center of gravity moves beyond the tilt axis (fulcrum). Such mechanism conventionally comprises as an electromagnetic brake of a worm gear which can be self-locked. When an electromagnetic brake is used as a stop for the actuator which is subject to both tensile and compressive loads, an increased cost results disadvantageously. The use of a worm gear suffers from a low mechanical efficiency, disadvantageously requiring a motor of an increased capacity.

SUMMARY OF THE INVENTION

Accordingly, it is an object of the invention to provide an actuator which can be manufactured with a reduced cost and which provides an improved mechanical efficiency.

Such object is accomplished in accordance with the invention by providing an actuator comprising a threaded shaft which is rotatably mounted in a housing, a tubular output rod which is fitted around the threaded shaft for elevating motion in response to the rotation of the threaded shaft, a rotary drive transmission mechanism which transmits a rotating drive from a drive source to the threaded shaft, the actuator being also associated with a lock mechanism which locks the transmission mechanism in the event the drive source ceases to operate. In addition, the lower end of the threaded shaft extends through an opening formed in the housing wall, while an abutment member or members are disposed on the threaded shaft either above or below a portion thereof where it extends through the opening, or both thereon. A thrust pad is disposed between the abutment member(s) and the housing wall.

Above and other objects, features and advantages of the invention will become apparent from the following description of several embodiments thereof with reference to the drawings.

BRIEF DESCRIPTION OF THE DRAWINGS

FIG. 2 is a plan view, FIG. 3 is a front view, and FIG. 4 is a cross section taken along the line IV—IV shown in FIG. 2;

FIGS. 6 to 15 are schematic views illustrating the operation of the lock mechanism at various sequential phases;

FIG. 18 is an illustration of a lock mechanism, FIG. 19 is a perspective view of an intermediate gear, and FIG. 20 is a perspective view of a smaller cam gear, as viewed from the downward direction thereof;

FIG. 25 is a longitudinal section of a fifth embodiment;

FIG. 27 (b) is a longitudinal section of the arrangement of FIG. 27 (a) and;

FIG. 28 is a longitudinal section of a sixth embodiment.

DESCRIPTION OF EMBODIMENTS

Figure 1:
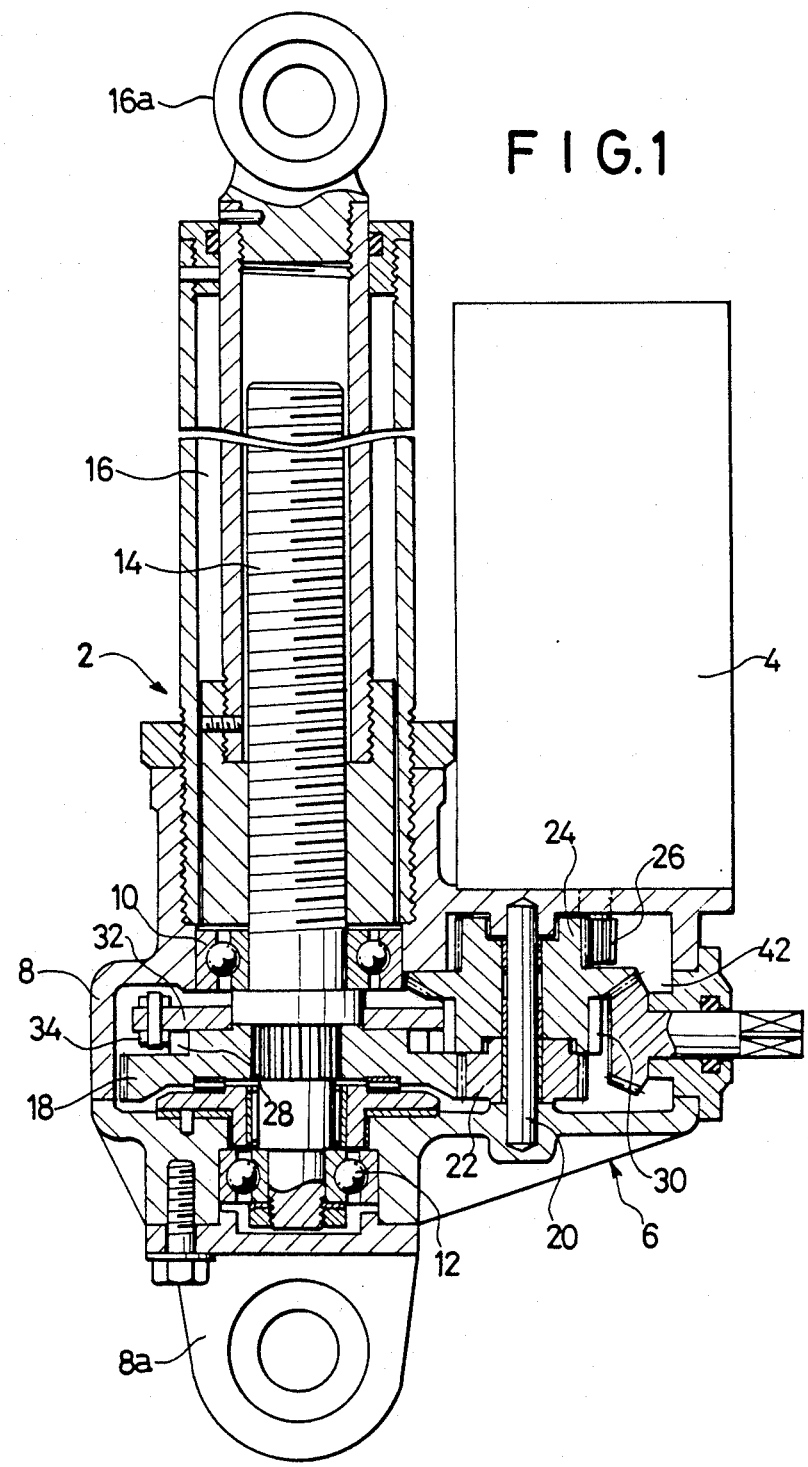
FIG. 1 is a longitudinal section of an actuator according to one embodiment of the invention.

Referring to the drawings, several embodiments of the invention will now be described. FIG. 1 is a longitudinal section of an actuator according to one embodiment of the invention. The actuator comprises an elevating mechanism 2, and a rotary drive transmission mechanism 6 which transmits a rotary drive from a motor 4 to the elevating mechanism 2. The elevating mechanism 2 comprises a threaded shaft 14 which is rotatably mounted within a housing 8 by means of bearings 10, 12, and a tubular output rod 16 which is in threadable engagement with the outer peripheral surface of the threaded shaft 14. When the actuator shown is applied to a cab tilting apparatus, the lower end 8a of the housing 8 is connected to a chassis and the top end 16a of the output shaft 16 is connected to a cab, which is supported by a tilt shaft so as to be angularly movable with respect to the chassis, both in a rockable manner. Consequently, as the output shaft elevates in response to the rotation of the threaded shaft 14, the cab may be tilted forwardly or restored to its original position.

Figure 2:
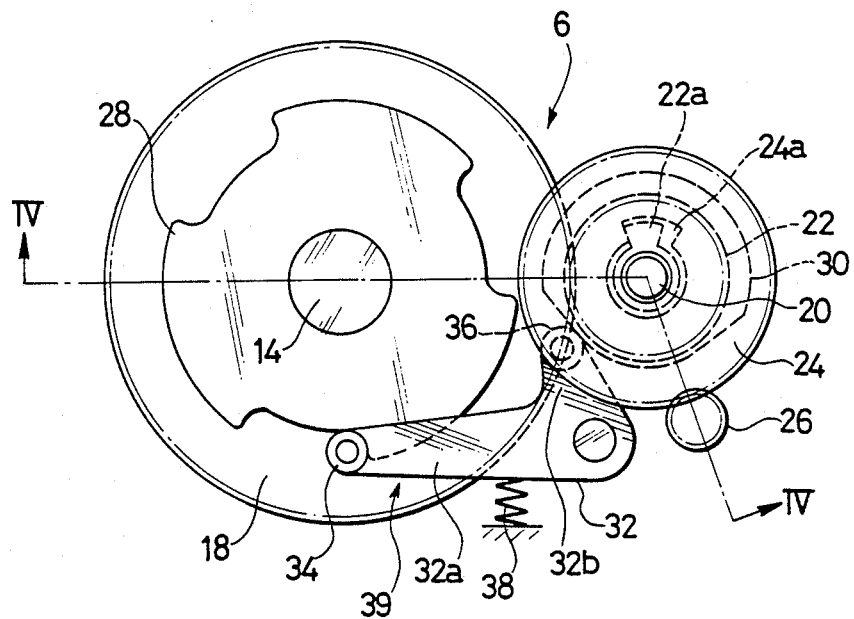
FIGS. 2 to 4 illustrate a rotary drive transmission mechanism, specifically.
Figure 5:
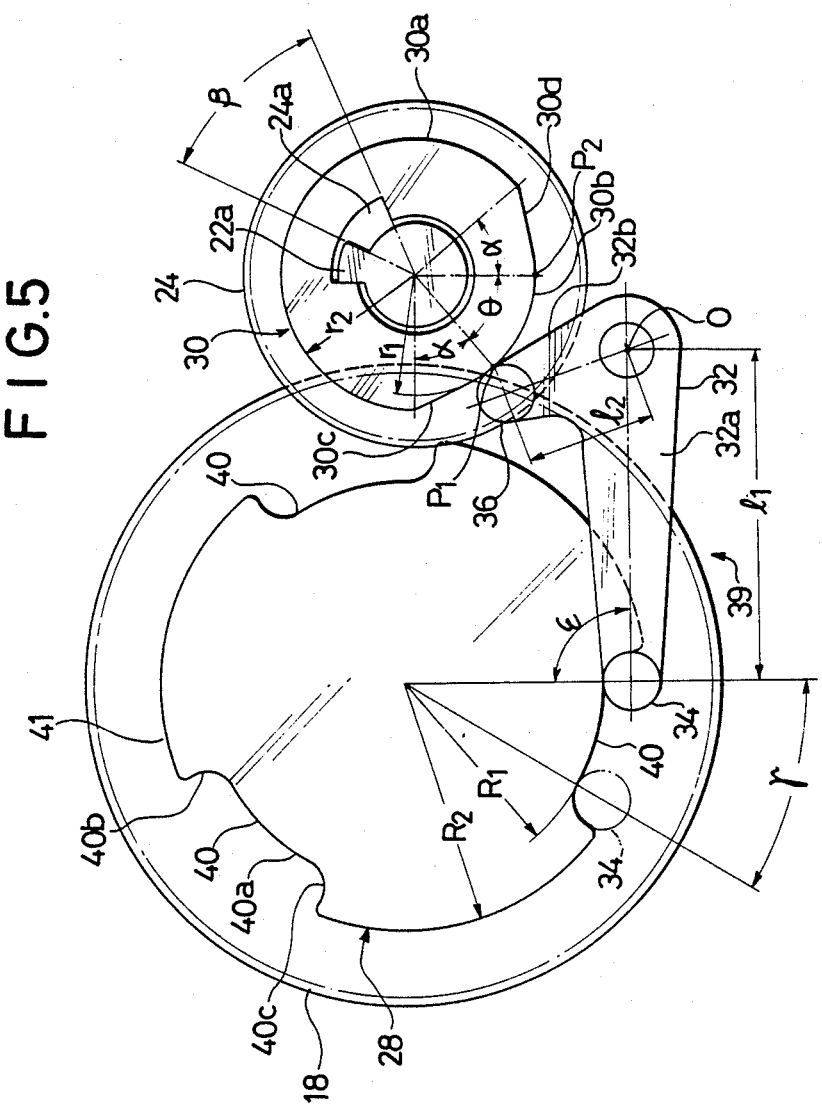
FIG. 5 is an illustration of a lock mechanism.

Referring to FIGS. 2 to 5 also, the rotary drive transmission mechanism 6 which transmits the rotation from the motor 4 to the threaded shaft 14 and a lock mechanism will be described. FIG. 2 is a plan view, FIG. 3 a front view and FIG. 4 a cross section taken along the line IV—IV shown in FIG. 2 of the transmission mechanism 6 while FIG. 5 is an illustration of the lock mechanism. It is to be noted that part of the lock mechanism (pin lever) is omitted from illustration in FIG. 4. The transmission mechanism 6 comprises a larger cam gear 18 fixedly mounted on the lower end of the threaded shaft 14, an intermediate gear 22 rotatably mounted on an intermediate shaft 20 and disposed for meshing engagement with the gear 18, and a smaller gear 24 rotatably mounted on the intermediate shaft 20 at a location above the intermediate gear 22. The smaller gear 24 is in meshing engagement with a drive shaft 26 of the motor 4 and is driven thereby for rotation. In its bottom surface, the gear 24 is formed with a recess 24a, in which a projecting portion 22a for engagement formed on the upper surface of the intermediate gear 22 is fitted with a given clearance as will be described in detail later, whereby the rotation of the gear 24 which is driven by the motor 4 is transmitted through the engagement between the recess 24a and the projecting portion 22a to the intermediate gear 22, and thence to the larger gear 18, thus driving the shaft 14 for rotation. In this embodiment, the gear ratio between the larger gear 18 and the intermediate gear 22 is selected to be 3.

A larger cam 28 is integrally mounted on top of the larger cam gear 18 while a smaller cam 30 is integrally formed on the bottom of the smaller cam gear 24 so as to be disposed in the common horizontal plane with the larger cam 28. A pin lever 32 has a long and a short arm 32a, 32b, each carrying a roller 34 and 36, respectively, which are urged into abutment against the cams 28, 30, respectively, under the resilience of a spring 38. The combination of the cam 28, 30 and the pin lever 32 forms a lock mechanism 39.

Referring to FIG. 5, the smaller cam 30 includes a portion 30a of an increased diameter and a portion 30b of a reduced diameter and which is concentric with the portion 30a, both of which are joined together by a pair of oppositely disposed rectilinear portions 30c, 30d. It is to be noted that the portion 30b of a reduced diameter subtends an angle of $\theta$ and the rectilinear portions 30c, 30d subtend an angle of $\alpha$, which are equal to 50° and 40°, respectively. It is to be noted that the recess 24a is formed at the rearward angle of 180° from the portion 30b of a reduced diameter, and a relative rotation between the projecting portion 22a on the intermediate gear 22 and the recess 24a may occur over an angle $\beta$ of 40°.

On the other hand, the larger cam 28 is formed with three notches 40 in its peripheral surface, which are disposed at an equal interval. Each notch 40 has a bottom surface 40a of an arcuate configuration which is concentric with the outer periphery 41 of the cam, with the opposite ends 40b, 40c of the bottom surface being shaped into an arcuate configuration which substantially conform to the peripheral surface of the roller 34. Each notch 40 is proportioned such that a pair of lines, each joining the center of the roller 34 and the center of the larger cam 28 when the roller is located in abutment against the respective ends 40b, 40c of the notch 40, define an angle $\gamma$ of 30°.

It is necessary that the lengths of the long and the short arm 32a, 32b of the pin lever 32 which carry the both rollers 34 and 36, respectively, or the distances $l_1$ and $l_2$, measured between the center of rotation (O) of the pin lever 32 and the respective center of the rollers 34 and 36 satisfy the following relationship:

$$\frac{l_1}{l_2} \approx \frac{R_2 - R_1}{r_2 - r_1} \quad (1)$$

where $R_2$ represents the radius of the outer periphery of the larger cam, $R_1$ the radius of the notched portion of the larger cam, $r_2$ the radius of the larger portion of the smaller cam and $r_1$ the radius of the smaller portion of the smaller cam.

While the values of angles $\alpha$, $\beta$, $\gamma$, $\theta$ of various parts which define the both cams 28, 30 have been chosen as mentioned, other values may also be chosen, provided the following equalities apply:

$$\alpha = \beta \quad (2)$$

$$\theta = \gamma \times N - \alpha \quad (3)$$

where N represents the gear ratio between the larger cam gear 28 and the intermediate gear 22. It should be understood that the number of notches 40 formed in the larger cam 28 be a multiple of N. It is preferred that the angle $\epsilon$ defined between a line joining the center of the roller 34 and the center of the larger cam 28 and another line joining the center of the roller 34 and the center of rotation (0) of the pin lever 32 under the condition shown in FIG. 5 be substantially equal to 90°.

The rotary drive transmission mechanism constructed in the manner mentioned above allows the rotation of the motor 4 to be transmitted to the elevating mechanism 2, which then drives the cab up and down. The transmission of the drive which takes place by the transmission mechanism 4 as well as the operation of the lock mechanism 39 in the event the motor 4 ceases to operate in the courses of tilting motion will now be considered.

The rotating drive from the motor 4 is transmitted to the smaller cam gear 24 which is in meshing engagement with the drive shaft 16, and the rotation of the gear 24 is transmitted to the intermediate gear 22 if the projecting portion 22a on the intermediate gear 22 abuts against the rear end face, as viewed in the direction of rotation of the recess 24a formed in the gear 24. Such rotation is then transmitted through the larger cam gear 18 which meshes with the intermediate gear 22 to the threaded shaft 14, thus driving the output rod 16 up and down. In the present embodiment, the smaller cam gear 24 rotates counter-clockwise when the cab is to be raised and rotates clockwise when the cab is to be lowered.

Figure 6:
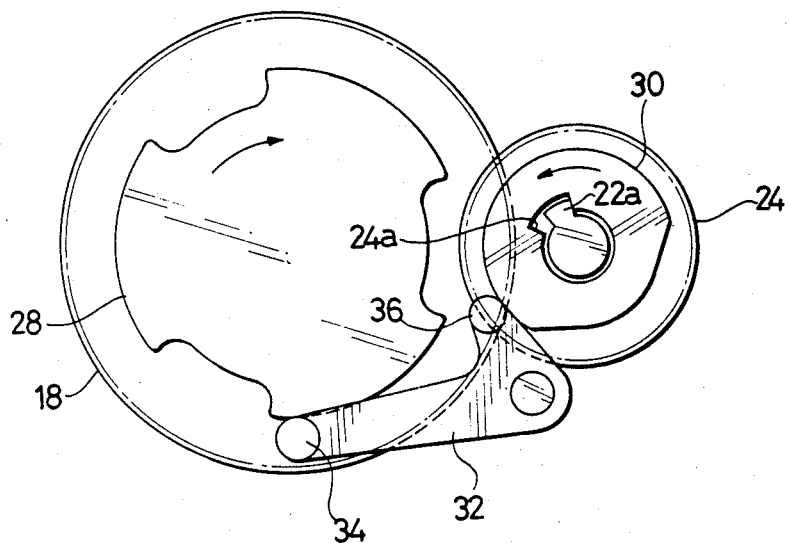

FIG. 6 shows a situation in which the cab is raised and the motor 4 ceases to operate before an over-tilt condition is reached in which the center of gravity of the cab has moved beyond the tilt axis. Under this condition, the drive from the motor 4 is ineffective, and hence the gravity of the cab causes the larger cam gear 18 to begin rotation in the opposite direction from its clockwise rotation which it has undergone during the raising motion. Such rotation of the larger cam gear 18 is transmitted to the intermediate gear 22, the rotation of which is immediately transmitted to the smaller cam gear 24 through the engagement between the projecting portion 22a and the recess 24a. As the larger and the smaller cam gear 18, 24 and hence the larger and the smaller cam 28, 30 rotate, the both rollers 34, 36 move along the respective cam surfaces (see FIG. 7). As the cab moves further downward and the larger cam 28 continues its rotation until the roller 34 reaches the end 40b of the notch 40, the engagement between the larger cam 28 and the roller 34 is effective to lock the larger cam gear 18 against further rotation, thus stopping the downward movement of the cab (the condition shown in FIG. 8). In order to allow the roller 34 to contact the bottom surface of the notch 40 in the larger cam 28, the roller 36 must be located on the portion 30b of a reduced diameter on the smaller cam 30. In addition, to unlock the larger cam 28 upon resuming the operation, the roller 36 must be located on the points of junction $P_1$, $P_2$ between the portion 30b of a reduced diameter and the rectilinear portions 30c, 30d when the arrangement is locked, as will be further described later. Accordingly, the larger and the smaller cam gear 18, 24, the pin lever 32 and the intermediate gear 32 must be predeterminately positioned such that when the roller 34 is located in abutment against the front end 40b, as viewed in the clockwise direction, of the notch 40 in the cam 28, the roller 36 is located on the rear end $P_2$, as viewed in the clockwise direction, of the portion 30b of a reduced diameter of the smaller cam 30 and the projecting portion 22a on the intermediate gear 22 engages the recess 24a formed in the smaller cam gear 24, as shown in FIG. 8.

Figure 8:
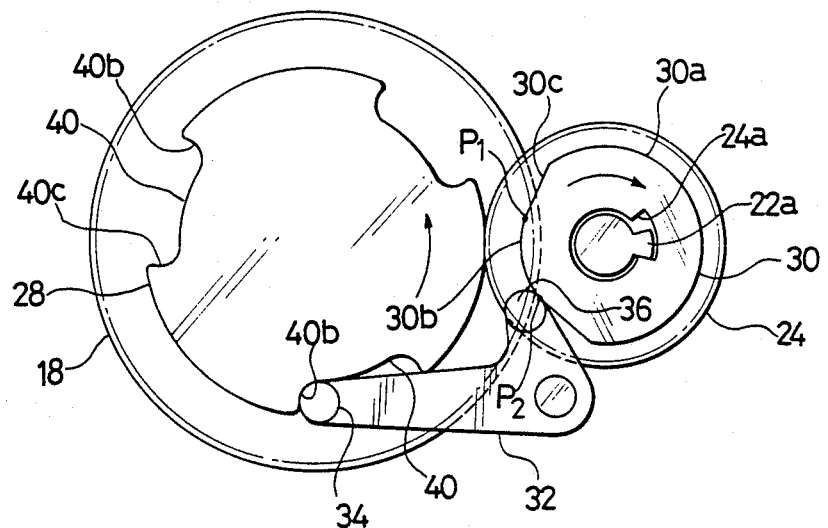

When the cab is to be raised again from the condition shown in FIG. 8, the motor 4 is set in motion again to rotate the smaller cam gear 24 counter-clockwise. The rotation of the gear 24 is immediately transmitted to the intermediate gear 22 through the engagement between the recess 24a therein and the projecting portion 22a, and is thence transmitted to the larger cam gear 18, thus causing it to rotate clockwise. The roller 36 then moves along the portion 30b of a reduced diameter and through the rectilinear portion 30c onto the portion 30a of an increased diameter. Since the gear ratio between the larger cam gear 18 and the intermediate gear 22 is equal to 3 as mentioned above, it follows that during the time the roller 36 moves along the portion 30b of a reduced diameter, the roller 34 moves through the notch 40 formed in the larger cam 28 over an angle of 50°/3, and while the roller 36 moves along the rectilinear portion 30c, the roller 34 further moves through 40°/3, thus reaching the other end 40c of the notch 40. As the roller 36 moves from the portion 30b of a reduced diameter through the rectilinear portion 30c onto the portion 30a of an increased diameter, the pin lever 32 rocks counter-clockwise through an amount corresponding to a difference $(r_2-r_1)$ between the radii of the increased and the reduced diameter, whereby the roller 34 moves radially outward through an amount corresponding to a difference $(R_2-R_1)$ between the radii of the outer periphery 41 and the notch 40. Accordingly, the roller 34 moves toward the outer periphery 41 of the larger cam 28 during the time it moves through the notch 40 through an angle (30°), thus preventing a locking operation with respect to the notch 40. Thus, the condition shown in FIG. 5 is resumed, allowing a further rotation.

Figure 9:
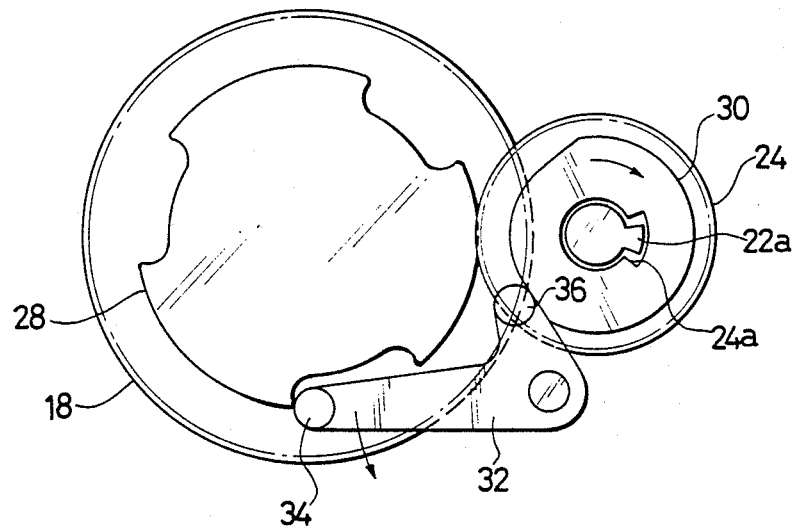
Figure 10:
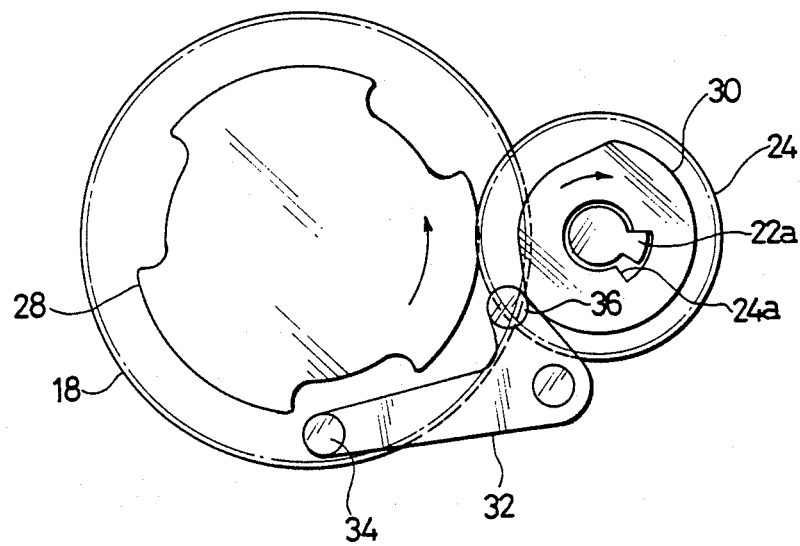

Conversely, when the cab is to be lowered from the condition shown in FIG. 8, the motor 4 causes the smaller cam gear 24 to rotate clockwise. This rotation of the gear 24 is not transmitted immediately since the projecting portion 22a on the intermediate gear 22 is located at the front end, as viewed in the clockwise direction, of the recess 24a formed in the smaller cam gear, and thus the intermediate gear 22 and the larger cam gear 18 remain at rest. The smaller cam gear 24 rotates through 40° until the projecting portion 22a is engaged with the recess 24a to begin transmitting the rotation, and in the meantime, the roller 36 moves along the rectilinear portion 30d of the smaller cam 30 from the portion 30b of a reduced diameter to its portion 30a of an increased diameter. Concommittently, the roller 34 moves radially outward of the larger cam 28 while undergoing no relative rotation with respect to the larger cam 28 (see FIG. 9), and thus is unlocked from the notch 40. When the recess 24a in the smaller cam gear engages the projecting portion 22a on the intermediate gear at the same time as the roller 34 is unlocked (see FIG. 10), the rotating drive is transmitted to allow the intermediate gear 22 and the larger cam gear 28 to being their rotation, thus lowering the cab.

The above description related to the elevating motion under the condition that the cab has not over-tilted. The operation which occurs under an over-tilt condition in which the center of gravity of the cab has moved past the tilt axis will be described below.

Figure 11:
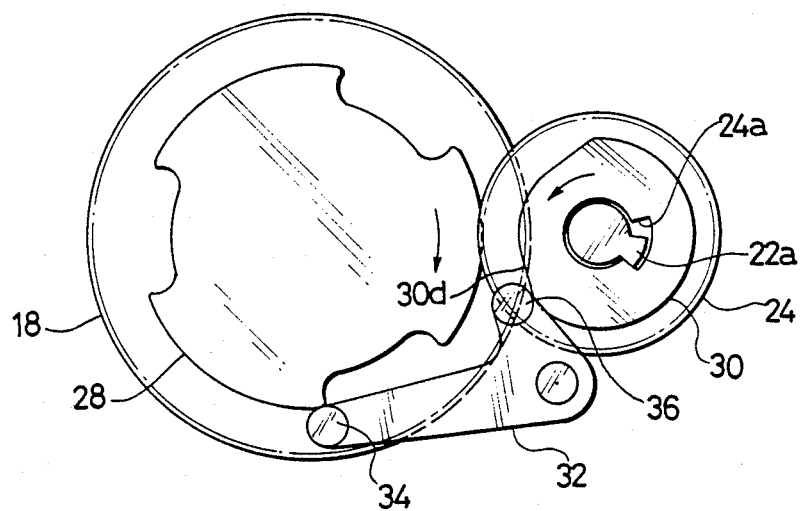
Figure 14:
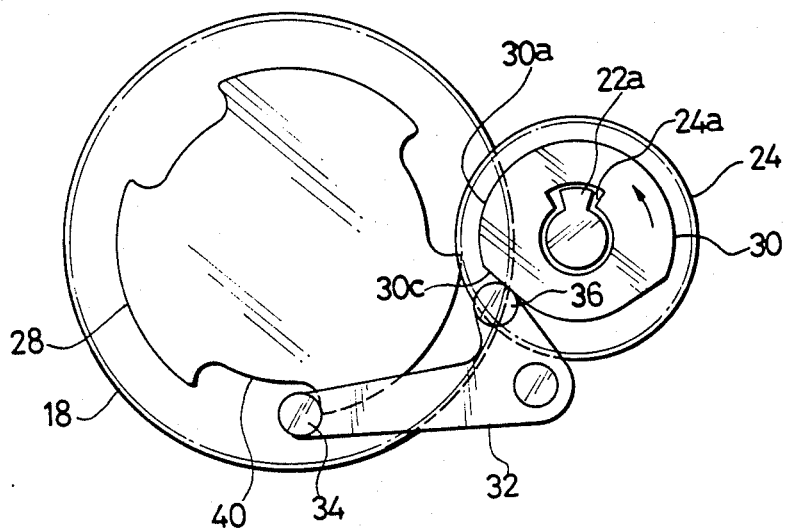

When the smaller cam gear 24 rotates counter-clockwise beyond the position where the center of gravity of the cab has reached directly above the tilt axis (see FIG. 11) and then ceases to operate under such an over-tilt condition, the cab tends to move forwardly, or in the same direction of rotation as it assumed during it is being raised, because of its gravity. Accordingly, the larger cam gear 18 rotates clockwise, which is in the same direction as it rotated during the time the cab is being raised. Such rotation of the larger cam gear 18 is transmitted to the intermediate gear 22, which then rotates counter-clockwise. However, because of a clearance between the projecting portion 22a on the intermediate gear and the recess 24a formed in the smaller cam gear, the smaller cam gear 24 begins to rotate with a delay of 40° with respect to the intermediate gear 22. When the roller 34 drops into the notch 40 as a result of the rotation of the larger cam 28 from the condition shown in FIG. 11, the roller 36 will be situated on the rectilinear portion 30d of the smaller cam 30 while the roller 34 clears from the bottom surface 40a of the notch 40 at this time. After the larger cam 28 has rotated through 40°/3 from the position which it assumed when the drive ceases, or after the rotation of the intermediate gear 22 through 40°, the projecting portion 22a on the intermediate gear 22 is effective to initiate the rotation of the smaller cam 30 (see FIG. 12). When the smaller cam 30 rotates in response to the rotation of the larger cam 28, the roller 36 moves from the rectilinear portion 30d to the portion 30b of a reduced diameter, whereupon the roller 34 moves into contact with the bottom surface 40a of the notch and moves therealong. A locked condition is established when the roller 34 engages the end 40c of the notch as the larger cam 28 further rotates (see FIG. 13), whereupon the rotation of the larger cam 28 is restricted, interrupting the over-tilt of the cab. At this time, the roller 36 is in abutment against the front end $P_1$, as viewed in the clockwise direction, of the portion 30b of a reduced diameter of the smaller cam 30.

Figure 3:
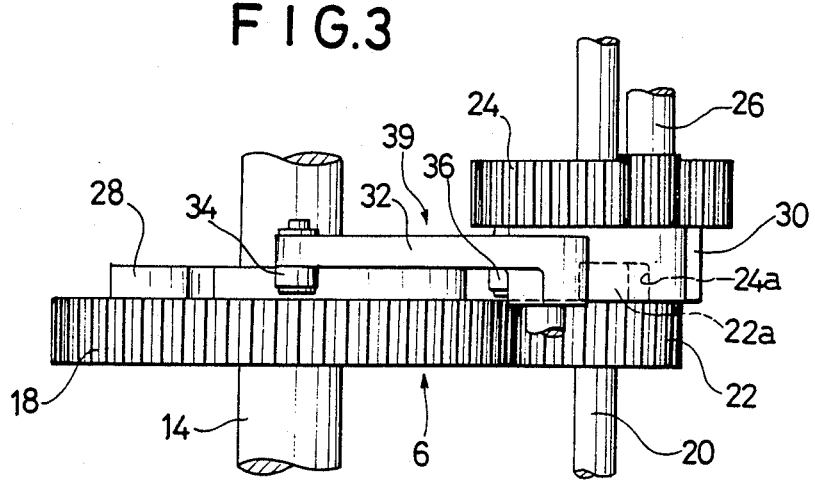
Figure 4:
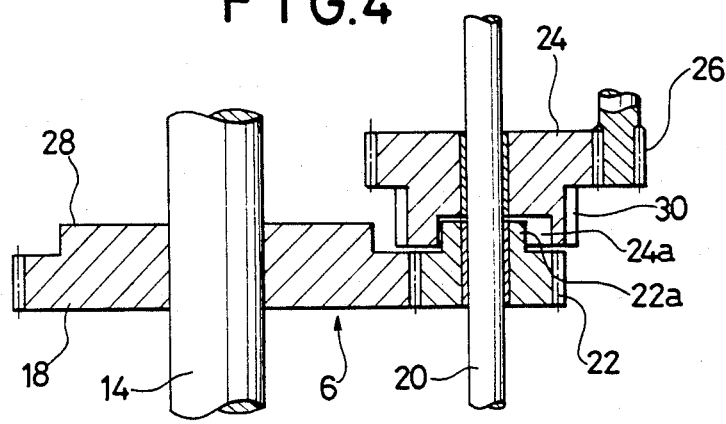
Figure 7:
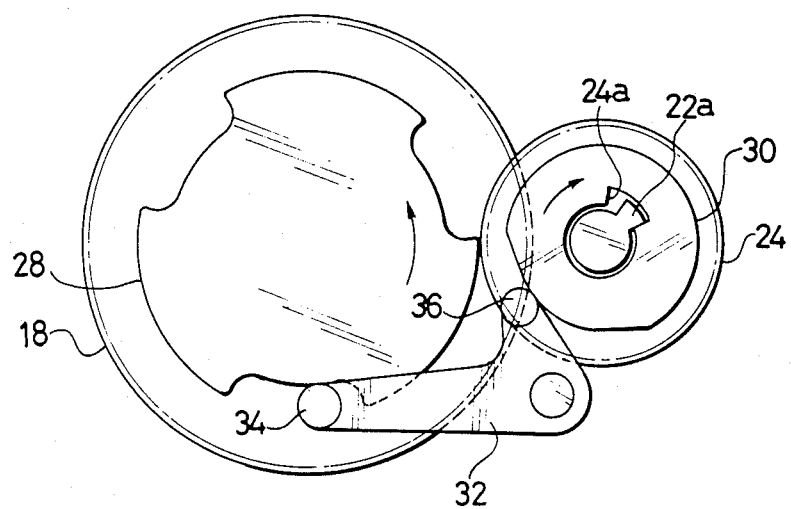

As discussed, if the larger and the smaller cam gear 18, 24 and the intermediate gear 22 are located so that the arrangement is locked under the condition illustrated in FIG. 8, when the roller 34 is locked in the opposite position within the notch 40, as illustrated in FIG. 3, from the position illustrated in FIG. 7, or when the roller 34 and the larger cam 28 have moved through 30° relative to each other, the intermediate gear 22 rotates through 90° and the smaller cam gear 24 rotates through 50° with a delay of angle $\beta(40°)$, so that it can be assured that the roller 36 may be brought into abutment against the front end $P_1$, as viewed in the clockwise direction, of the portion 30b of a reduced diameter of the smaller cam 30.

Figure 15:
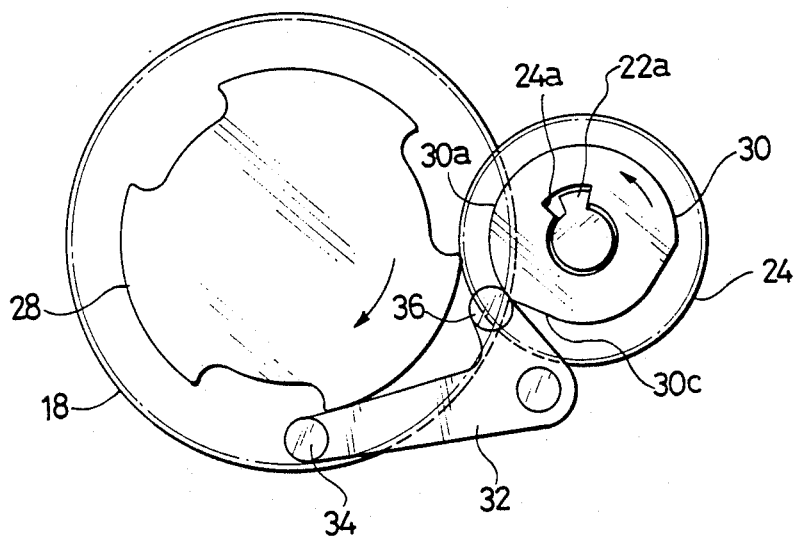

When the motor 4 is driven in a direction to cause a further over-tilt from the condition illustrated in FIG. 13, the smaller cam gear 24 rotates counter-clockwise, but the intermediate gear 22 and the larger cam gear 18 cannot rotate until the end of the recess 24a abuts against the projecting portion 22a on the intermediate gear, the accordingly the roller 36 moves along the rectilinear portion 30c onto the portion 30a of an increased diameter of the smaller cam in the meantime, causing the roller 34 to be displaced radially outward from within the notch 40. At the time the engagement between the projecting portion 22a and the recess 24a occurs, the roller 36 has reached the portion 30a of an increased diameter of the smaller cam, whereby the roller 34 has moved out of the notch 40, thus unlocking and allowing the rotation of the larger cam gear 18 (see Fig. 15).

Figure 17:
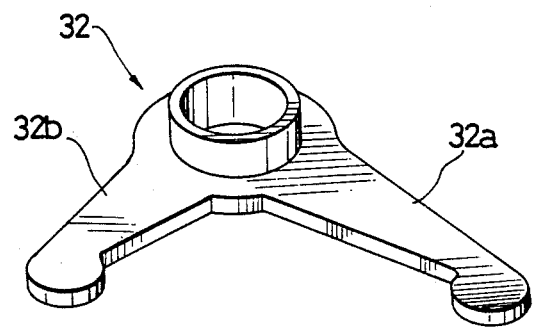
FIG. 17 is a perspective view of a pin lever.
Figure 16:
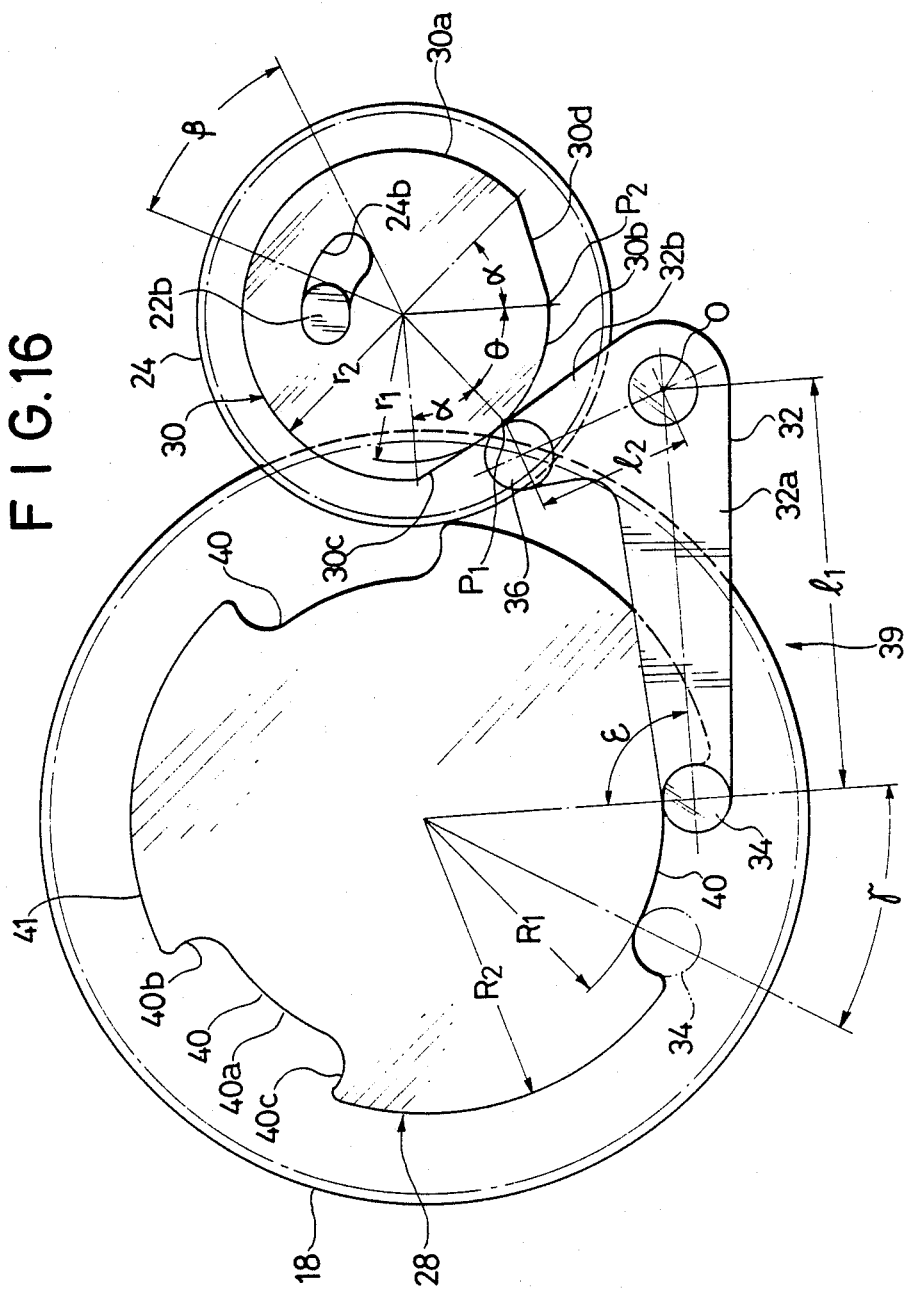
FIG. 16 is an illustration of a modified form of the lock mechanism.

As described, the present embodiment assures a reliable and safe operation and eliminates the likelihood of disengagement due to oscillations, since the cam roller 34 is engaged with either end of the notch 40 to establish a locked condition. Whenever the motor 4 is set in motion again, the lock mechanism can be automatically released, allowing the actuator to be driven again. It will be appreciated that as compared with a conventional arrangement which uses a worm gear, the mechanical efficiency is drastically improved, thus allowing a reduction in the size and the cost of the arrangement. It is to be noted that the smaller cam gear 24 is additionally provided with a bevel gear 42 (see FIG. 1), which may be manually rotated to achieve a tilting motion of the cab. Such manual operation is facilitated by the fact that the transmission mechanism 6 according to the invention attains a substantially higher mechanical efficiency as compared with a worm gear. It will be appreciated that the configuration of the cams 28, 30, is not limited to that illustrated in the embodiment, but alternatively curvilinear portions may be substituted for the rectilinear portions 30c, 30d of the smaller cam 30. Also it should be understood that the configuration of the recess and the projecting portion for engagement is not limited to the above arrangement, further arrangement of this invention permits relative rotation through only the above-described angle like the rotation of an arcuate slot 24b and a projection 22b fitted therebetween as shown in FIG. 16, but any rotation over the angle may be permitted if it is possible to transmit the rotation to each other. Further, this invention is not limited to the arrangement that the cam followers abut against the larger and the smaller cam 28, 30 comprises the rollers 34, 36 which are disposed on the both arms 32a, 32b as described-above, this invention may be arranged that the ends of the both arms 32a, 32b directly abut against the cams 28, 30 as shown in the arrangement of FIG. 17.

Figure 18:
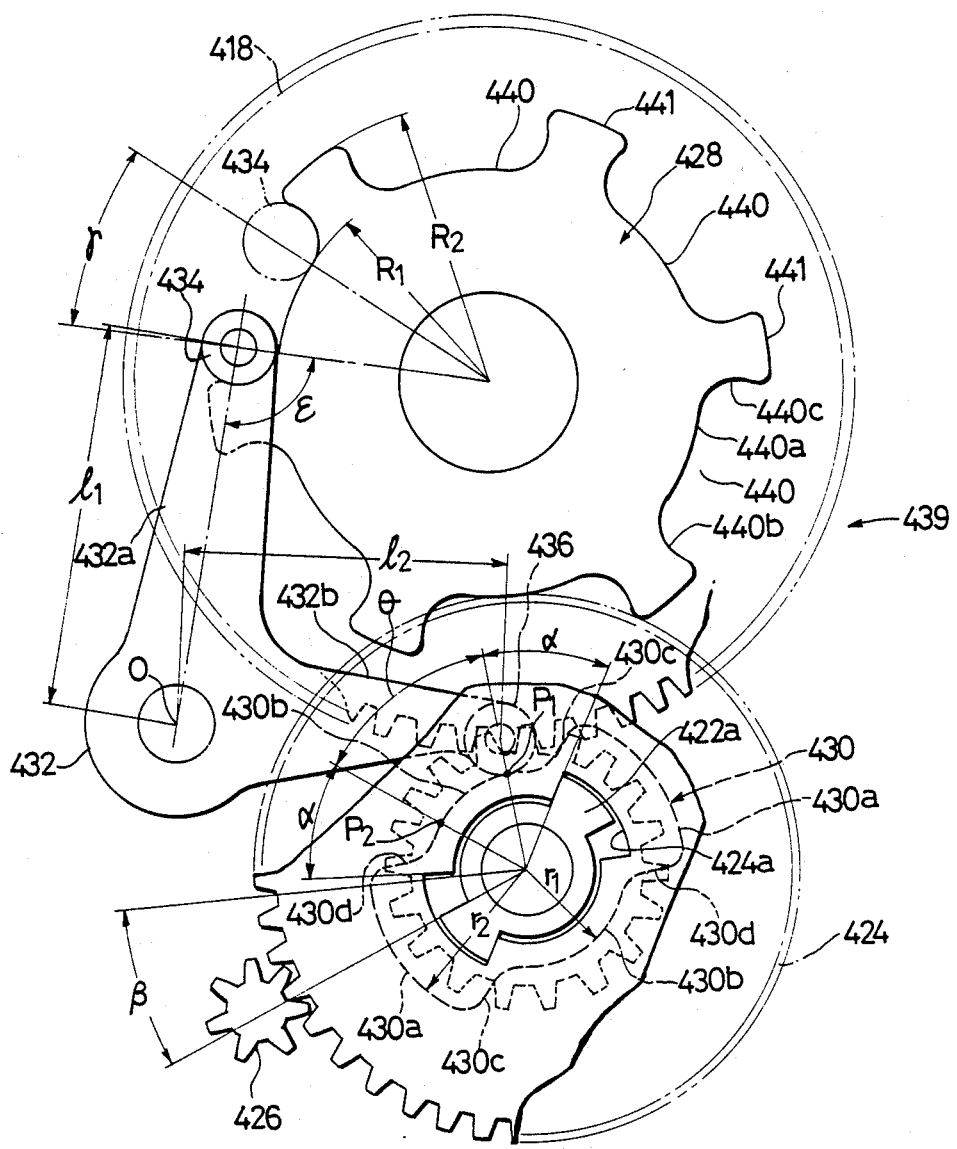
FIGS. 18 to 20 illustrate a second embodiment, specifically.
Figure 19:
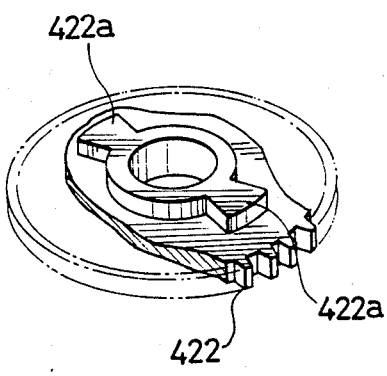
Figure 20:
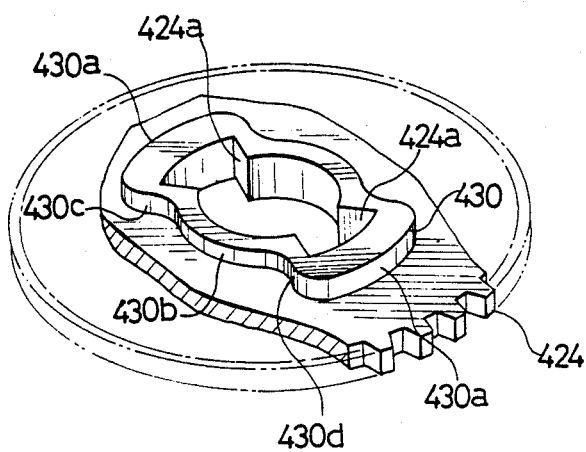

Referring to a second embodiment of FIGS. 18 to 20, this embodiment is substantially identical to the above-described embodiment except the arrangement that comprises a larger cam and a smaller cam, projecting protions for engagement provided on an intermediate gear and recesses of a smaller cam gear, so that it will not be specifically described.

While the larger cam 428 is formed with six notches 440 in its peripheral surface, which are disposed at an equal interval, the smaller cam 430 includes a pair of portions 430a of an increased diameter oppositely positioned each other and a pair of portions 430a of a reduced diameter and which is concentric with the portions 430a, both of which are joined together by a pair of oppositely disposed curvilinear junctures 430c, 430d.

A pair of projecting portions 422a are formed on the upper surface of the intermediate gear 422 as shown in FIG. 19. On the other hand, on the bottom of the smaller cam gear 424, a pair of recesses 424a are formed in which a both of the projecting portions 422a of the intermediate gear 422 are fitted to be relatively rotatable therebetween respectively (FIG. 20 shows a perspective view of the smaller cam gear, as viewed from the downward direction thereof).

The larger cam 428, the smaller cam 430, the projecting portions 422a of the intermediate gear 422, the recesses 424a of the smaller cam gear 424 relating to the above arrangement satisfy the relationships (1), (2) and (3) applied in the above description and also can fulfill a function as a lock mechanism by the same operation as the above embodiment.

Furthermore, this invention can apply this arrangement having each of two projecting portions for engagement and two recesses of the second embodiment to the coupling mechanism of the first embodiment.

Figure 21:
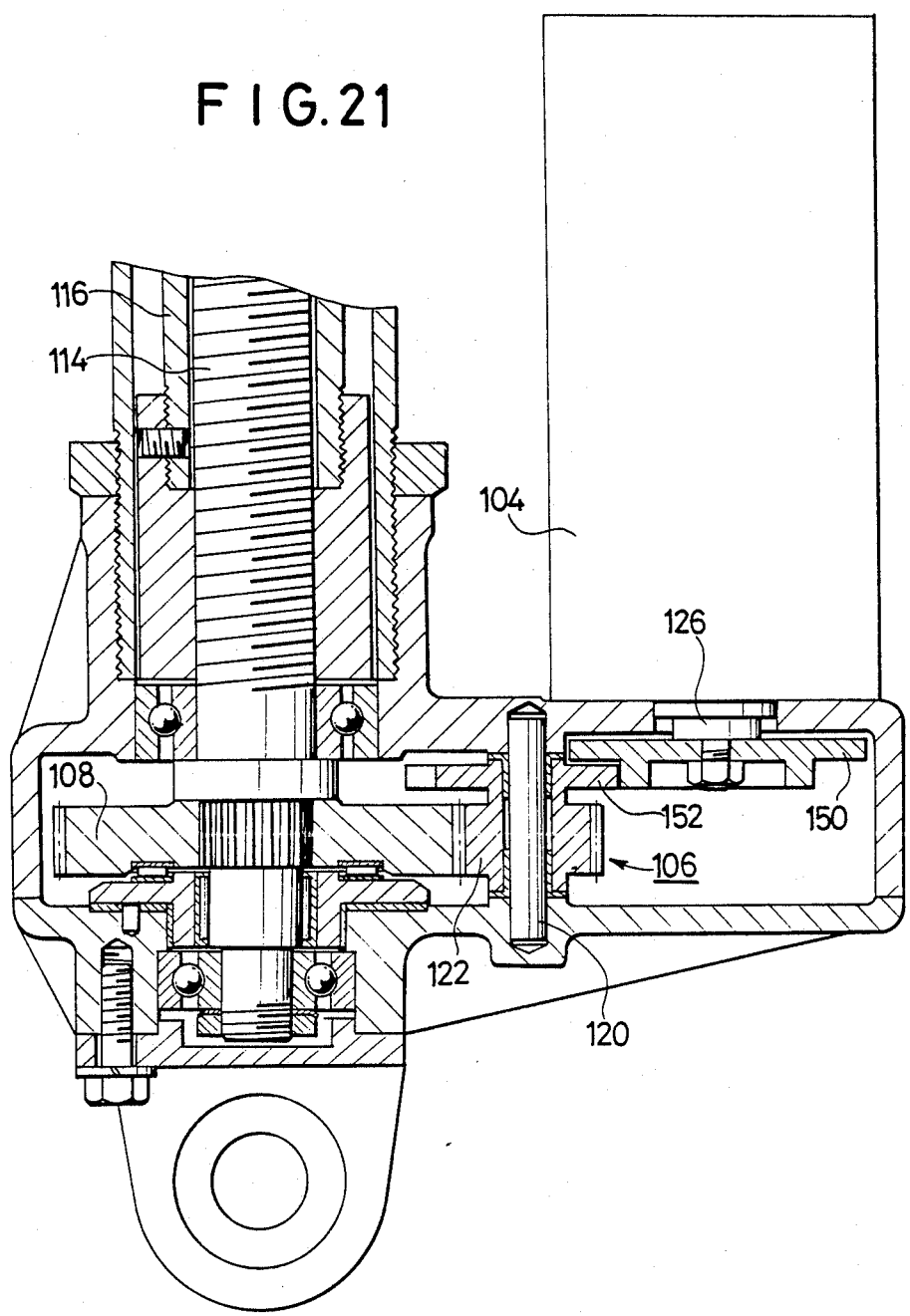
FIG. 21 is a longitudinal section of a third embodiment.
Figure 22:
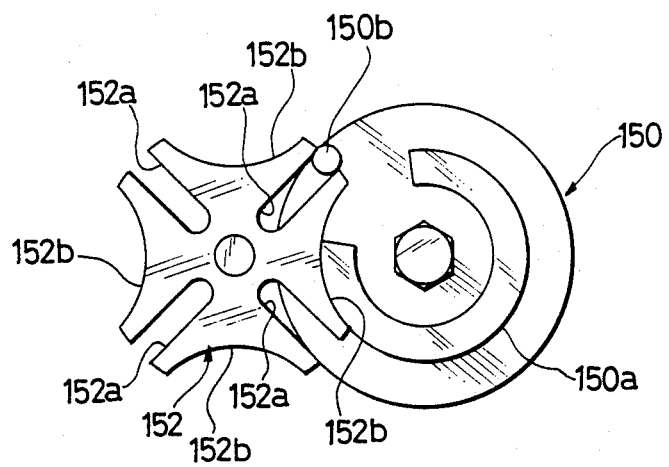
FIG. 22 is a plan view of essential part of the third embodiment

FIGS. 21 and 22 show a third embodiment of the invention, which differs from the previous first embodiment of the invention in the construction of a rotary drive transmission mechanism 106 including a lock mechanism. Specifically, a rotary drive from a motor 104 is transmitted to a threaded shaft 114 for causing an elevating motion of an output rod 116. On its lower end, the threaded shaft 114 fixedly carries a larger gear 118 which is in meshing engagement with an intermediate gear 122 rotatably mounted on an intermediate shaft 120 which extends in parallel relationship with the threaded shaft 114. A so-called Geneva gearing is disposed between the top of the intermediate gear 122 and the drive shaft 126 of the motor 104. Specifically, referring to FIG. 22, a prime mover wheel 150 is mounted on the drive shaft 126, and is formed with a raised arc 150a, and a pin 150b thereon. A follower wheel 152 is integrally mounted on top of the intermediate gear 122, and is formed with four radially extending grooves 152a and four arc-shaped recesses 152b conforming to the configuration of the raised arc 150a and which are located between adjacent grooves 152a. In the embodiment shown, the use of a Geneva gearing in the rotary drive transmission mechanism 106 causes the drive from the motor 104 to be transmitted intermittently, and the application of a rotating torque in either forward or reverse direction to the threaded shaft 114 cannot cause its rotation as a result of locking. Accordingly, a similar operation takes place as in the previous embodiment.

Figure 24:
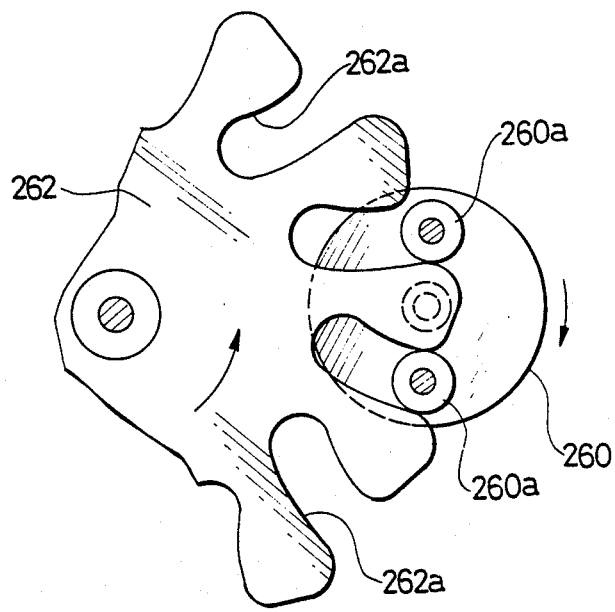
FIG. 24 is a plan view of essential part of the fourth embodiment.
Figure 23:
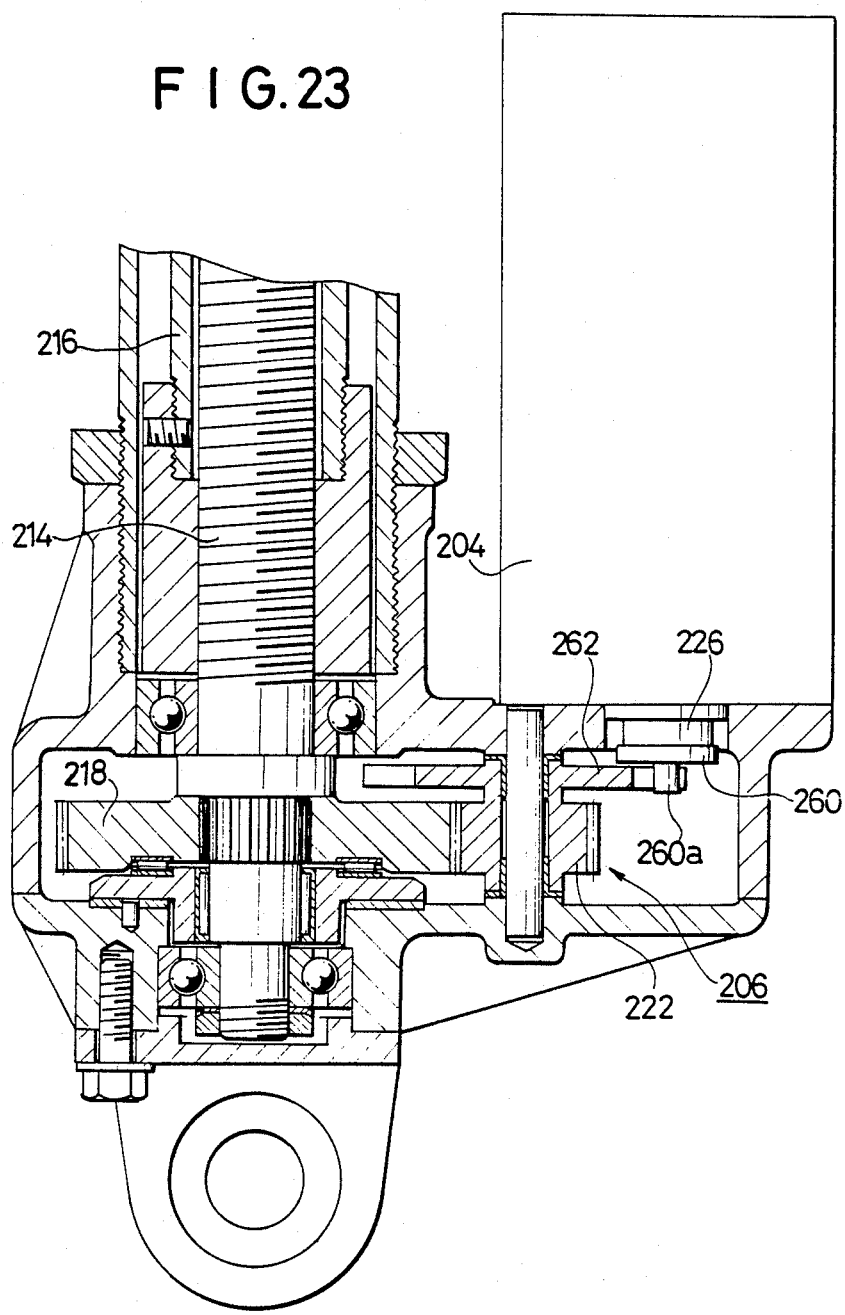
FIG. 23 is a longitudinal section of a fourth embodiment.

FIGS. 23 and 24 illustrate a fourth embodiment of the invention in which a rotating drive is transmitted by means of an intermittently rotating mechanism which includes a pinned roller. A prime mover wheel 260 is mounted on the drive shaft 226 of a motor 204, and carries a pair of pinned rollers 260a along its circumference. A follower wheel 262 is integrally mounted on an intermediate gear 222 and is peripherally formed with a plurality of notches 262a therein. The rotation of the motor 204 is intermittently transmitted to the intermediate gear 222 through the prime mover wheel 260 and the follower wheel 262, and thence transmitted through a larger gear 218 to cause a rotation of a threaded shaft 214, thus producing an elevating motion of an output rod 216. Again, any rotating torque either in forward or reverse direction applied to the threaded shaft 214 cannot cause its rotation since the arrangement is locked.

Figure 26:
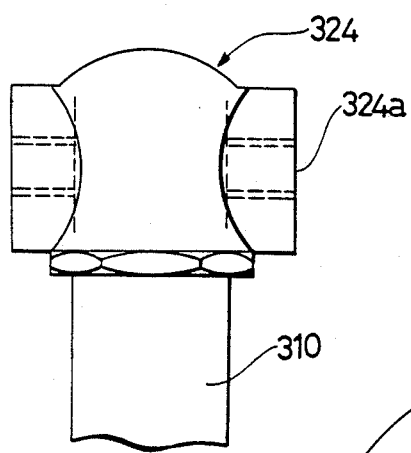
FIG. 26 is a side elevation of upper part of the actuator as shown in FIG. 25.

FIGS. 25 and 26 illustrate a fifth embodiment of the invention, specifically, FIG. 25 is a longitudinal section and FIG. 26 a side elevation of the top portion thereof. Specifically, a threaded shaft 302 is peripherally formed with a ball groove 302a, and its lower end is rotatably mounted within a housing 304. A drive from a motor 308 is transmitted thereto through a rotary drive transmission mechanism or a reduction gearing 306, thus causing its rotation.

More specifically, a tubular output rod 310 is fitted around the threaded shaft 302, and is internally formed with a ball groove 310a. A number of balls 312 are received in a space defined between the ball grooves 310a and 302a, and are supplied from or delivered to ball tubes 314 which are secured to the output rod 310, thus defining a ball screw 316. Thus, the rotating effort of the threaded shaft 302 is transmitted through the ball screw 316 to the output rod 310 to cause its axial elevating motion. In the present embodiment, the ball screw 316 is actually in two sets for improving the strength, but it should be understood that a single set may be employed. The ball screw 316 is surrounded by a boot 318, preventing the ingress of dusts.

An inner race 320a of a bearing 320 is secured to the top end of the threaded shaft 302 by a nut 322, and a rolling member 320b is retained between the inner race 320a and the internal peripheral surface of the output rod 310, thus defining the bearing 320. During the elevating motion of the output rod 310, the internal peripheral surface of the output rod 310 defines a track surface for the rolling member 320b for guiding the output rod 310 for elevating motion. The bearing 320 may be replaced by a roller bearing, needle bearing or the like.

A fastener 324 is threadably engaged with the outer periphery of the output rod 310 at its top end. The actuator of this embodiment is used by connecting a fastening member 324a of the fastener 324 (see FIG. 26) to a cab, not shown, while connecting the lower end of a housing 304 to a chassis, not shown, in a rockable manner, thus causing the cab to tilt in response to the upward movement of the output rod 310.

The housing 304 comprises a first and a second housing member 305, 307, with the second housing member 307 including a wall 307a which extends in a direction perpendicular to the axis of the threaded shaft 302 in its top portion. The wall 307a has an opening 307b formed therein, through which the lower end 302b of the threaded shaft 302 extends downwardly.

A gear 326 is fixedly mounted on a portion of the threaded shaft 302 which is disposed above the housing wall 307a, and is in meshing engagement with a small gear 330 rotatably mounted on the lower portion of an intermediate shaft 328 which extends parallel to the threaded shaft 302. Rotatably mounted on the top end of the intermediate shaft 328 is a gear 332, the bottom of which is defined as a bevel gear, the gear 332 meshing with a gear 334 mounted on the drive shaft of the motor 308. By coupling means, not shown, the gears 330 and 332 mounted on the upper and the lower portions of the intermediate shaft 328 are arranged so as to be capable of integral rotation. The gear 334 on the drive shaft, the gears 330 and 332 on the intermediate shaft 328 and the gear 326 on the threaded shaft 302 define the reduction gearing 306 which transmits the drive from the motor 308 to the threaded shaft 302. The reduction gearing include a lock mechanism, similar to that of the first embodiment, assembled therein, but will not specifically described.

Formed in the bottom surface of the gear 326 on the threaded shaft 302 is a recess 326a, in which an annular member 336 fitted around the threaded shaft 302 is received, with a thrust bearing 337 interposed between the gear 326 and the annular member 336. A oneway clutch 338 is mounted on the threaded shaft 302 inside the annular member 336, and a thrust pad 346 is fixedly mounted on the second housing member 307 and interposed between the annular member 336 and the wall 307a of the second housing member 307. It is to be noted that the oneway clutch 338 may comprise a ratchet mechanism or the like. The lower end 302b of the threaded shaft 302 which projects through the opening 307b formed in the second housing member 307 fixedly carries a ring 342 which is secured in place by a nut 344, with a thrust pad 347 being interposed between the ring 344 and the wall 307a of the second housing member 307 and fixedly mounted on the latter.

Figure 27A:
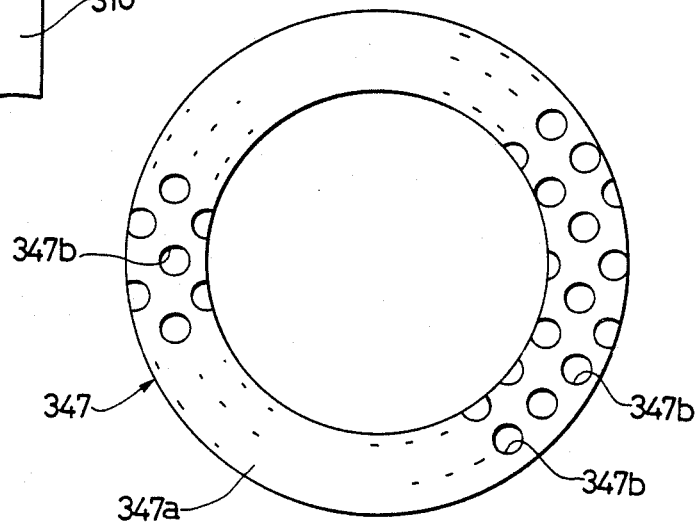
FIG. 27 (a) is a plan view of a thrust pad.
Figure 27B:
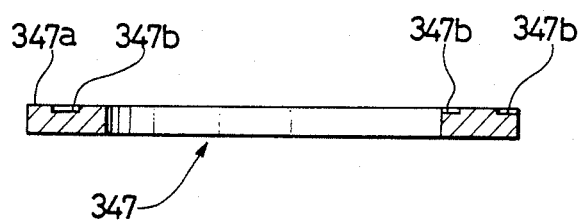

As shown in FIGS. 27 (a) and (b) where only the pad 347 is illustrated since the both pads are of an identical configuration, each of the thrust pads 346, 347 comprises an annular sheet having one surface 347a in which a number of depressions 347b are formed to retain a lubricant such as grease therein. The thrust pad is mounted on the second housing member 307 so that the surface 347a may abut against the annular member 336 or the ring 342. Alternatively, the thrust pads 346, 347 may be secured to the annular member 336 and the ring 342, respectively. Finally, it is to be understood that the threaded shaft 302 is supported by bearings, not shown, such as roller bearings or needle bearings which permit an axial movement thereof.

In operation, the rotation of the motor 308 is transmitted through the reduction gearing 306 to the threaded shaft 302, the rotation of which is transmitted through the ball screw 316 to the output rod 310, thus driving it upward. The output rod 310 moves upward while its internal surface is guided by its sliding contact with the rolling member 320b of the bearing 320. As a consequence, the cab which is fastened to the fastener 324 moves angularly about a tilt axis, not shown, which acts as a fulcrum to assume a forwardly tilted position. When the cab is tilted in this manner, the weight of the cab applies a compressive load upon the output rod 310, tending to rotate the threadable shaft 302 in a direction to lower the output rod 310. However, the force which acts to reverse the rotation of the threaded shaft 302 is resisted by the one way clutch 338 and the thrust pad 346 which is disposed between the annular member 336 and the second housing member 307, thus ceasing a downward movement due to the weight of the cab.

As the output rod 310 is driven further upward to cause the cab to tilt forwardly until the center of gravity of the cab moves past the tilt axis to enter an over-tilt condition, the cab will tend to fall over forwardly by its own gravity. At this time, a tensile load is applied to the output rod 310, tending to rotate the threaded shaft 302 in a direction to raise the output rod 310 upward. However, the ring 342 mounted on the lower end of the threaded shaft 302 abuts against the lower thrust pad 347, with a resulting force of friction acting to prevent the resulting rotation of the threaded shaft 302, thus preventing the turn-over of the cab.

However, the over-tilt condition generally prevails only slightly, with consequence that the tensile load will be reduced in magnitude as compared with the compressive load. Accordingly, a smooth operation is assured during the downward movement of the cab since the driving arrangement has sufficient margin to overcome any friction of force resulting from the thrust pad which is added to the force acting to lower the cab.

Where the tilt angle of the cab may be increased to result in an increased over-tilt condition, it is preferred that the one way clutch be also incorporated into the lower thrust pad 347 since then the tensile load will approach values close to the compressive load.

As described, in the present embodiment, the combination of the one way clutch 338 and the upper thrust pad 346 opposes the compressive load applied to the output rod 310 while the lower thrust pad 347 opposes the tensile load applied to the output rod 310, thus providing an actuator of a low cost and having an increased mechanical efficiency. The construction which allows a lubricant to be retained on the surface of the thrust pads 346 and 347 assures a low coefficient of friction required for the operating response of the actuator and its increased useful life.

In the embodiment described above, the actuator has been driven by an electric motor 308, but any other drive source other than an electric motor may be used. By way of example, the bevel gear 332 on the intermediate shaft 328 may be disposed in meshing engagement with another bevel gear to which a handle is attached, thereby achieving a rotation thereof by a manual operation with similar effect.

FIG. 28 shows a sixth embodiment of the invention where similar parts as shown before are designated by like numerals and will not be specifically described. A first housing member 305 includes a wall 305a which extends in a direction perpendicular to the axis of a threaded shaft 302, and the wall 305a is formed with an opening 305b through which the lower end 302b of the threaded shaft 302 extends downward. The portion 302b of the threaded shaft 302 which projects below the opening 305b has a reduced diameter than its upper protion 302c, and the gear 326 is fitted around the portion 302b at its top end and is secured in place by a nut 327. A thrust pad 349 is interposed between the upper surface of the gear 326 and the lower surface of the wall 305a, and is secured to the wall 305a. In this embodiment also, when the center of gravity of the cab moves beyond the tilt axis to enter an over-tilt condition, the gear 326 (abutting member) secured to the threaded shaft 302 abuts against the thrust pad 349, with the resulting friction serving to prevent a turn-over of the cab, thus preventing the possibility of runaway from occurring in response to an inadvertent input of wrong polarity.

In the embodiment shown in FIG. 28, the lower end 302b of the threaded shaft 302 may project through the wall 307a of the second housing member 307 to allow a thrust pad, similar to that used in the first embodiment, to be mounted thereon so that the pair of thrust pads which are vertically spaced apart may be effective to prevent a turn-over of the cab. In this embodiment, the thrust pad has been secured to the wall, but obviously it may be mounted on the abutting member.

While the invention has been shown and described above in connection with several embodiments thereof, it should be understood that a number of changes, modifications and substitutions will readily occur to one skilled in the art without departing from the spirit and the scope of the invention as defined by the appended claims, and accordingly, it is intended that the scope of the invention be solely defined by the appended claims.

What is claimed is:

1. In an actuator comprising means defining a housing, a threaded shaft rotatably mounted within said housing, a tubular output rod fitted around said threaded shaft and capable of undergoing an elevating motion as said threaded shaft rotates, a rotary drive transmission mechanism for transmitting a rotating drive from a drive source to said threaded shaft, the improvement wherein a lock mechanism is provided for locking said rotary drive transmission mechanism when said drive source ceases to operate, wherein said rotary drive transmission mechanism comprises a first gear fixedly mounted on said threaded shaft, an intermediate shaft extending parallel to said threaded shaft, a second gear rotatably mounted on said intermediate shaft and meshing with said first gear, a third gear rotatably mounted on said intermediate shaft and driven for rotation by said drive source, and a coupling mechanism for transmitting a rotating drive between said second gear and said third gear, wherein said coupling mechanism comprises at least one recess formed in one of said second gear and said third gear and a projecting portion formed on the other of said second gear and said third gear and fitted in said one recess, wherein said projecting portion is rotatable through a given angle within said recess, and wherein said lock mechanism comprises a first cam fixedly and concentrically mounted on said first gear, a second cam fixedly and concentrically mounted on said third gear, a lever including a pair of arms each carrying a cam follower and disposed so as to be rotatable about a point located between said arms, and a spring acting to urge a respective one of said respective cam followers against a corresponding one of said cams, said first cam having at a periphery thereof a plurality of notches which are circumferentially spaced apart at an equal interval, each notch having a bottom surface which is concentric with an outer peripheral surface of said first cam in a region where it is not notched, said second cam including a portion of an increased diameter, a portion of a reduced diameter concentric with said portion of said increased diameter, and a pair of junctures which join the opposite sides of said portion of a reduced diameter to said portion of an increased diameter, the aforementioned combination of structure satisfying the following relationships:

$$\frac{l_1}{l_2} = \frac{R_2 - R_1}{r_2 - r_1} \quad (1)$$

$$\alpha = \beta \quad (2)$$

$$\theta = \gamma \times N - \alpha \quad (3)$$

wherein:
$L_1$ represents the distance between the center of said cam follower which abuts against said first cam and said center of rotation of said lever,
$L_2$ represents the distance between the center of said cam follower which abuts against said second cam and said center of rotation of said lever,
$R_1$ represents the radius of the bottom surface of said notch in said first cam,
$R_2$ represents the radius of the outer periphery of said first cam,
$r_1$ represents the radius of said portion of a reduced diameter on said second cam,
$r_2$ represents the radius of said portion of said increased diameter of said second cam,
$\theta$ represents an angle which said portion of a reduced diameter on said second cam subtends with respect to its center,
$\alpha$ represents an angle which a juncture of said second cam subtends with respect to its center, β represents an angle over which the projecting portion is angularly movable within the recess of said coupling mechanism, γ represents an angle formed between lines which join the center of the both cam followers and the center of said first cam when said cam follower is located at either end of said notch in said first cam, and N represents a gear ratio of said first gear to said second gear, and wherein the number of the notches in said first cam is an integral multiple of N.

2. The actuator according to claim 1, wherein said projecting portion and said recess are respectively formed at opposite positions from said center of rotation.

3. The actuator according to claim 1, wherein said first cam is peripherally formed with three notches and said second cam includes a portion of an increased diameter and a portion of a reduced diameter.

4. The actuator according to claim 1, wherein said first cam is peripherally formed with six notches and said second cam includes a pair of portions of an increased diameter and a pair of portions of a reduced diameter, both of which are alternately formed in its peripheral surface.

5. The actuator according to claim 1, wherein said cam followers are rollers rotatably supported at free ends of both arms.

6. The actuator according to claim 1, wherein said cam followers are end surfaces of both arms directly abutting against said first and the second cams.

7. An actuator according to claim 1, in which the housing is connected to a chassis frame while the output rod is connected to a cab which is supported by a tilt shaft so as to be angularly movable with respect to the chassis frame, thus allowing the actuator to be used as an elevating mechanism for a cab tilting apparatus.

* * * * *